US011816401B2

(12) United States Patent
Causse et al.

(10) Patent No.: US 11,816,401 B2
(45) Date of Patent: Nov. 14, 2023

(54) PROVIDING FOR UNCERTAINTY IN NON-LINEAR INVERSIONS OF GEOPHYSICAL DATA

(71) Applicant: EQUINOR ENERGY AS, Stavanger (NO)

(72) Inventors: Emmanuel Causse, Trondheim (NO); Janniche Iren Nordskag, Buvika (NO)

(73) Assignee: EQUINOR ENERGY AS, Stavanger (NO)

( * ) Notice: Subject to any disclaimer, the term of this patent is extended or adjusted under 35 U.S.C. 154(b) by 588 days.

(21) Appl. No.: 17/050,360

(22) PCT Filed: Apr. 11, 2019

(86) PCT No.: PCT/NO2019/050082
§ 371 (c)(1),
(2) Date: Oct. 23, 2020

(87) PCT Pub. No.: WO2019/209114
PCT Pub. Date: Oct. 31, 2019

(65) Prior Publication Data
US 2021/0064800 A1    Mar. 4, 2021

(30) Foreign Application Priority Data
Apr. 26, 2018    (GB) .................................. 1806861

(51) Int. Cl.
*G06F 30/20*    (2020.01)
*E21B 49/00*    (2006.01)
(Continued)

(52) U.S. Cl.
CPC .............. *G06F 30/20* (2020.01); *E21B 49/00* (2013.01); *G01V 1/30* (2013.01); *G01V 3/38* (2013.01);
(Continued)

(58) Field of Classification Search
CPC .... G01V 2210/66; G01V 1/282; G01V 1/306; G01V 99/005; G01V 2210/67;
(Continued)

(56) References Cited

U.S. PATENT DOCUMENTS

2011/0090760 A1    4/2011    Rickett et al.
2011/0264421 A1    10/2011    Jing et al.
(Continued)

FOREIGN PATENT DOCUMENTS

CA    2330969 C    * 11/2005    ............. E21B 43/16
CA    2609350 C    *  9/2011    ............. E21B 43/00
(Continued)

OTHER PUBLICATIONS

Eidesmo et al., "Sea Bed Logging (SBL), a new method for remote and direct identification of hydrocarbon filled layers in deepwater areas", first break, vol. 20.3, Mar. 2002, pp. 144-152.
(Continued)

*Primary Examiner* — Zakiya W Bates
(74) *Attorney, Agent, or Firm* — Birch, Stewart, Kolasch & Birch, LLP

(57) ABSTRACT

A method of obtaining a model of a sub-surface region, the model comprising a three dimensional matrix of sub-surface material property values. The method comprises providing a first approximation of said model, and performing simulations using the model to generate (i) a reference upgoing energy wave data set $d_0$, where the acquisition parameters used in the simulation are a set of known acquisition parameters, and (ii) a plurality of perturbed upgoing energy wave data sets $d_0$ where the acquisition parameters are obtained by randomly perturbing said set of known acquisition parameters. The method further comprises forming a matrix D, the columns of which are the differences $d_i$–$d_0$ between the ith perturbed data set and the reference data set,
(Continued)

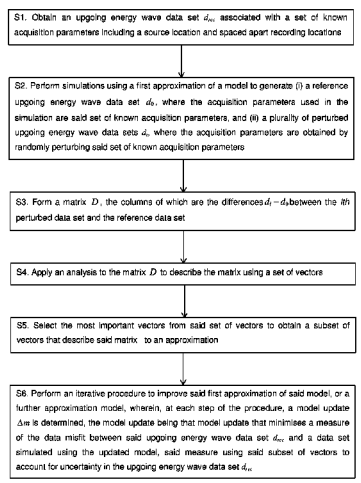

applying an analysis to the matrix D to describe the matrix using a set of vectors, and selecting the most important vectors from said set of vectors to obtain a subset of vectors that describe said matrix D to an approximation. An iterative procedure is performed to improve said first approximation of said model, or a further approximation model, wherein, at each step of the procedure, a model update Δm is determined, the model update being that model update that minimises a measure of the data misfit between said upgoing energy wave data set $d_{rec}$ and a data set simulated using the updated model, said measure using said subset of vectors to account for uncertainty in the upgoing energy wave data set $d_{rec}$.

11 Claims, 1 Drawing Sheet

(51) Int. Cl.
*G01V 1/30* (2006.01)
*G01V 3/38* (2006.01)
*G06F 111/10* (2020.01)

(52) U.S. Cl.
CPC ...... *E21B 2200/20* (2020.05); *G01V 2210/66* (2013.01); *G06F 2111/10* (2020.01)

(58) Field of Classification Search
CPC .......... G01V 2210/675; E21B 2200/20; E21B 49/00; E21B 47/00; E21B 41/00
See application file for complete search history.

(56) References Cited

U.S. PATENT DOCUMENTS

2015/0073755 A1 3/2015 Tang et al.
2016/0061974 A1 3/2016 Bansal et al.

FOREIGN PATENT DOCUMENTS

WO WO 2012/134621 A1 10/2012
WO WO 2016/180457 A1 11/2016

OTHER PUBLICATIONS

GB Search Report issued in Application No. GB1806861.9 dated Oct. 26, 2018.
International Search Report for PCT/NO2019/050082 (PCT/ISA/210) dated Jul. 2, 2019.
Myer et al., "CSEM uncertainties and inversion", SEG Las Vegas 2012 Annual Meeting, pp. 1-4.
Written Opinion of the International Searching Authority for PCT/NO2019/050082 (PCT/ISA/237) dated Jul. 2, 2019.

\* cited by examiner

S1. Obtain an upgoing energy wave data set $d_{rec}$ associated with a set of known acquisition parameters including a source location and spaced apart recording locations

↓

S2. Perform simulations using a first approximation of a model to generate (i) a reference upgoing energy wave data set $d_0$, where the acquisition parameters used in the simulation are said set of known acquisition parameters, and (ii) a plurality of perturbed upgoing energy wave data sets $d_i$, where the acquisition parameters are obtained by randomly perturbing said set of known acquisition parameters

↓

S3. Form a matrix $D$, the columns of which are the differences $d_i - d_0$ between the *ith* perturbed data set and the reference data set

↓

S4. Apply an analysis to the matrix $D$ to describe the matrix using a set of vectors

↓

S5. Select the most important vectors from said set of vectors to obtain a subset of vectors that describe said matrix to an approximation

↓

S6. Perform an iterative procedure to improve said first approximation of said model, or a further approximation model, wherein, at each step of the procedure, a model update $\Delta m$ is determined, the model update being that model update that minimises a measure of the data misfit between said upgoing energy wave data set $d_{rec}$ and a data set simulated using the updated model, said measure using said subset of vectors to account for uncertainty in the upgoing energy wave data set $d_{rec}$

PROVIDING FOR UNCERTAINTY IN NON-LINEAR INVERSIONS OF GEOPHYSICAL DATA

TECHNICAL FIELD

The present invention relates to a method of providing for uncertainty in non-linear inversions of geophysical data including electromagnetic and seismic data. More particularly the invention provides a mechanism that allows the differing uncertainties of data points within a measured data set to be accounted for when computing a measure of the data misfit between that data set and a simulated data set.

BACKGROUND

Seismic imaging has long been used to determine the geological structure of a sub-surface region, for example as an aid to the identification of hydrocarbon bearing regions. The basis of conventional seismic imaging techniques is the generation at the surface, or in a body of water above the surface, of acoustic sound waves which propagate through the surface and the detection of upgoing waves at the surface (or again within the body of water) which result from reflection of the downgoing waves from sub-surface reflectors. The process of generating an image of the sub-surface from the seismic data is known as "inversion".

More recently, imaging processes that make use of electromagnetic (EM) techniques have been developed. These processes generally make use of a source of electromagnetic energy at the surface, e.g. on the seabed, (or possibly above the surface or downhole) and a plurality of EM detectors at or close to the surface. One particular EM technique used for sub-sea imaging is known as Controlled Source EM (CSEM) and uses an active source towed behind a boat [Eidesmo, T., Ellingsrud, S., MacGregor, L. M., Constable, S., Sinha, M. C, Johansen, S., Kong, F. N. and Westerdahl, H., 2002, Sea Bed Logging (SBL), a new method for remote and direct identification of hydrocarbon filled layers in deepwater areas, First Break (20), pp 144-152.]. Again, the process of generating a sub-surface image (in effect a resistivity profile of the sub-surface) from the EM data is known as "inversion".

Imaging is typically enormously computationally expensive, meaning that it is both financially expensive and time consuming to perform. If an assumption turns out to be incorrect, it might be several days before that assumption can be corrected and an analysis re-run. Taking shortcuts can lead to poor imaging quality, leading, in a worst case scenario, to drilling wells in a poor location or making incorrect assumptions about existing hydrocarbon reserves.

In both seismic and EM (specifically CSEM) approaches one may attempt to build a geological model of the subsurface which, when the known seismic or EM energy is injected into it, generates simulated detected data that closely matches the actual detected data. Such approaches start with a basic geophysical model and iteratively adjust the model until the simulated and detected results converge, at which point one can assume that the model closely approximates the real sub-surface geology. A finite difference or finite element method may be used to generate the simulated data using the model and the input data. This process is an example of non-linear inversion.

Taking an EM approach as an example, the model consists of a 3-dimensional representation of the sub-surface made up of a large number of cells. Each cell is assigned a resistivity (or its inverse, conductivity) value. At each iterative step, the simulated results are compared with the recorded data to generate some difference or data misfit measure and the model adjusted to reduce the measure. The process of selecting the adjustment to make can be very computationally expensive as it typically requires adjusting the value of each cell in turn to determine which adjustment generates the best reduction in the determined data misfit measure.

Even if the principle is very simple there are large differences between existing non-linear inversion methods. The most advanced methods (i.e. the most advanced formulas applied to update the model) are basically too computer intensive to be applied to the large-scale imaging problems that are met in petroleum exploration. The algorithms are therefore simplified at the cost of less efficient model updates. Many types of simplifications can be applied, and they can have large implications on the final quality of the images. There is a general trade-off between inversion quality and numerical efficiency or "cost" (i.e. how much disk memory is required and how much time it will take to get the inversion result).

Several formulas exist to calculate the adjustment. A very general one is the equation given by Tarantola (1984). With some slight adjustments, we can rewrite this equation as follows:

$$m_{k+1} = m_k - \underbrace{(J^* C_d^{-1} J + C_m^{-1})^{-1}}_{H_k} \underbrace{(J^* C_d^{-1} \Delta d + C_m^{-1}(m_k - m_0))}_{g_k}$$

where $m_k$ and $m_{k+1}$ are vectors defining the current model and the subsequent improved model (in terms of resistivity values within each cell of the model), $m_0$ is the initial model, $\Delta d$ is the difference between the simulated data in model $m_k$ and the recorded data, and $J = \partial \Delta d / \partial m_k$ is the jacobian matrix of data derivatives with respect to the model parameters and * denotes a conjugate transpose. The information contained by J is important: it shows how the data difference is changed by changing the resistivity independently in each cell of the model. $C_d^{-1}$ is the inverse of the covariance matrix of the data errors and $C_m^{-1}$ is the inverse of the covariance matrix of model parameters describing a priori information on the model. $H_r$ will be explained later.

For a given survey, a data set is collected. Consider for example CSEM where we typically have many different positions for the emitting electromagnetic source, and a number of receivers pulled behind the source or lying down on the seabed. For each source position and each receiver, we typically have data points for perhaps five different frequencies, two EM field types (electric and magnetic), and two orientations (x and y). The measured number is complex, and described by two numbers (magnitude & phase, or real & imaginary). We therefore have forty (5×2×2×2) data points per receiver and source position. We may have 100 receivers or more, shot over, e.g. 10 tow lines (sail lines of the acquisition boat). These lines can be for example 40 km long with a 100 m spacing between two source positions. The data set collected for the survey can therefore comprise thousands of measurement points.

In non-linear inversion, the data misfit between the observed data (measurements) and the simulated data is iteratively reduced as discussed above. In practice, this data misfit is defined by a single number which is large when the two data sets are very different and small when the two data sets are similar. So, while the full data set consists of thousands of measurement points, the difference between two data sets (in particular a recorded data set vs a simulated data set) is characterized by one single number. It is of course important to carefully choose how the data misfit is derived from the data sets and the choice can have an important impact on the inversion quality. Simplistically, a good choice for the data misfit measure is one that respects the structure of the uncertainty in the data. For instance, it must consider the fact that there are measurement errors, and that these errors are not the same on the different data points. Ideally, one would wish to reduce the contribution (to the single value representative of the data misfit) of data points that are likely to have a high error whilst emphasising the contribution of data points likely to have a small error. If this is not done appropriately, uncertainty in the data sets will result in uncertainty in the final results.

SUMMARY

According to a first aspect of the present invention there is provided a method of obtaining a model of a sub-surface region, the model comprising a three-dimensional matrix of sub-surface material property values. The method comprises obtaining an upgoing energy wave data set $d_{rec}$ associated with a set of known acquisition parameters including a source location and a plurality of spaced apart recording locations within, at or above the surface, the upgoing energy waves depending on downgoing energy waves and the sub-surface material properties. There is then provided a first approximation of said model, and simulations are then performed using the model to generate (i) a reference upgoing energy wave data set $d_0$, where the acquisition parameters used in the simulation are said set of known acquisition parameters, and (ii) a plurality of perturbed upgoing energy wave data sets $d_i$, where the acquisition parameters are obtained by randomly perturbing said set of known acquisition parameters.

The method further comprises forming a matrix D, the columns of which are the differences $d_i-d_0$ between the ith perturbed data set and the reference data set, applying an analysis to the matrix D to describe the matrix using a set of vectors, and selecting the most important vectors from said set of vectors to obtain a subset of vectors that describe said matrix D to an approximation. The method further comprises performing an iterative procedure to improve said first approximation of said model, or a further approximation model, wherein, at each step of the procedure, a model update $\Delta m$ is determined, the model update being that model update that minimises a measure of the data misfit between said upgoing energy wave data set $d_{rec}$ and a data set simulated using the updated model, said measure using said subset of vectors to account for uncertainty in the upgoing energy wave data set $d_{rec}$.

In the case of an electromagnetic survey, said sub-surface material property values may be sub-surface material electromagnetic property values, e.g. electrical resistance or impedance values, and said energy wave is an electromagnetic energy wave.

In the case of a seismic survey, said sub-surface material property values may be sub-surface material accoustic property values, e.g. acoustic impedance, velocity and/or denisty, and said energy wave is a seismic energy wave.

In one embodiment, said step of applying an analysis to the matrix D to describe the matrix using a set of vectors comprises a principal component analysis and said vectors are singular vectors, wherein said step of applying an analysis to the matrix D to describe the matrix using a set of vectors comprises applying singular-value decomposition, SVD, to obtain a decomposition of the matrix D in the form $$D=F_0S_0K_0=F_0W_0,$$

and retaining only the first Nc columns to obtain reduced matrices $$D \approx FSK=FW$$

where the columns of F are the set of vectors.

The measure of the data misfit may be determined using the formula:

$$\phi_d(m)=\tfrac{1}{2}\Delta d^*(FS^{-2}F^*+(1/\lambda_{N_c+1}^2)(I+FF^*))\Delta d$$

where $\Delta d=\Delta d(m)=d(m)-d_{rec}$ is a column vector of size $N_d$ representing the difference between simulated and recorded data, * represents a complex conjugation, and $\lambda_{N_c}$ is a singular value of a least important one of the selected most important vectors.

The step of obtaining an upgoing energy wave data set $d_{rec}$ may comprise operating one or more energy sources at, above, or within a surface of said sub-surface region to produce said downgoing energy waves and operating detectors at said spaced apart recording locations to detect said upgoing energy waves, and recording the detected upgoing waves. The upgoing energy waves may be obtained from a recorded signal by separating it out from other energy components, e.g. downgoing energy waves.

The step of obtaining an upgoing energy wave data set $d_{rec}$ may comprise operating one or more energy sources within a body of water above a surface of said sub-surface region to produce said downgoing energy waves and operating detectors at said spaced apart locations to detect said upgoing energy waves, and recording the detected upgoing waves. Again, the upgoing energy waves may be obtained from a recorded signal by separating it out from other energy components, e.g. downgoing energy waves.

The method may comprise displaying said model on a computer display such that different sub-surface material property values are represented by different colour properties.

According to a second aspect of the present invention there is provided a method of selecting a region in which to drill in order to produce hydrocarbons and comprising applying the method of the above first aspect of the present invention to obtain a model of a sub-surface region, and examining the model to identify locations within the sub-surface likely to produce hydrocarbons.

According to a third aspect of the present invention there is provided a method of producing hydrocarbons and comprising selecting a region in which to drill using the method of the above second aspect of the present invention, drilling one or more wells in that region, and producing hydrocarbons from the well or wells.

BRIEF DESCRIPTION OF THE DRAWINGS

FIG. 1 is a flow diagram illustrating a method of obtaining a model of a sub-surface region.

DETAILED DESCRIPTION

It will be appreciated that the approaches described below will be executed primarily on computers comprising processors and memory. However, the size and capacity of both may be significantly reduced as compared with the implementation of prior art imaging approaches, and or imaging quality may be improved. It will also be appreciated that the approaches may be configured to provide images in renderable form for display on a computer display. Indeed, in some approaches this will be required in order to allow relevant experts to inspect the imaging results.

As has been discussed above, it is critical to the accuracy of non-linear inversion approaches that the means for evaluating the data misfit, between the measured data set and the simulated data sets, be properly chosen. Consider for example the case where one component of the recording equipment is not working correctly during a survey, e.g. one receiver indicates a zero measured signal. During the non-linear inversion process, the system will try to create an erroneous model in an attempt to make the simulated data points equal to zero for the receiver in question. The data difference on that receiver will dominate the total misfit and therefore the inversion process, probably resulting in a very artificial model. To avoid this, one must define the misfit so that it can accept a few points with large differences. In other words, if there is a risk that a receiver may fail, the misfit definition must take this risk into account.

It is also important to consider the effect on errors of scaling and correlation and in particular how appropriate scaling and correlation of data points can be uesed to minimise error when generating a data misfit value. This is illlustrated by the following two examples.

Example 1

Consider a scenario in which a receiver (or a source point) is slightly mispositioned, i.e. it is thought to be at a given position (and that position is used when simulating the data), but the receiver is in reality one meter further away from the source position. This mispositioning creates an error on the measurement: the simulated data will be slightly too strong or slightly too weak compared to the real data (since the amplitude of the field has a very strong decay with distance). This error is likely to be much larger for a receiver that is close to the source point than for a receiver that is far from it. In other words, uncertainty decreases with increasing offset.

In modern approaches to EM inversion, the EM data is typically scaled with the inverse of the uncertainty, where the uncertainty model consists of a constant, additive part, and a multiplicative part proportional to the field itself. The multiplicative part accounts for the fact that measurement uncertainty is larger at small offsets. When scaling the data, the predominance of short-offset data is reduced and a better balance is obtained between the data points. This more correct description of uncertainty has brought large improvements to EM inversion approaches.

Example 2

In current EM inversion approaches, correlations between errors on two different data points are generally assumed to be zero (i.e. no correlation). An exception, in some approaches, is to assume a correlation of 1 (i.e. full correlation) between errors on certain data points. This is the case when up/down separation (a technique to attenuate the contribution of the strong "air wave" bouncing at the sea-surface and reflected downwards, which partly masks the signals coming from the subsurface) is applied to the EM data. [Specifically, in EM surveys, for a given receiver, a specific offset and a specific frequency, the uncertainties between the electric field E and and the magnetic field H are assumed to have correlation of 1 when we do up/down separation, and 0 when we do not. This is not entirely correct as actual corralations may differ to a greater or lesser extent.] Both assumptions, i.e. always 0 correlation or a mix of 0 and 1, are therefore incorrect.

Assuming zero correlation means that we consider the errors on different data points to be completely independent. This is not however true in all cases. An error in receiver calibration, for instance, will affect all the frequencies in the same way (the field at all frequencies will be either too high or too low). Whether errors are correlated or not is very important. If you repeat a measurement several times (e.g. by using many receivers) and the errors are uncorrelated, the different measurements add up but the errors do not, and the signal-to-noise ratio is improved. This is well-known in seismic surveys, where seismic traces are "stacked" to improve the signal-to-noise ratio. However, if errors are highly correlated, stacking has no effect on the signal-to-noise ratio: both the signal and the noise are equally strengthened by the summation. Conversely, certain combinations of data points (e.g. subtracting data from two different frequencies) can have a much higher signal-to-noise ratio than the original data points (since noise is correlated, it can be subtracted and becomes near zero). If these combinations carry as much information about the subsurface as the original data points, and if inversion accounts for the correlations, this may result in a very large increase in the effective signal-to-noise ratio compared with ignoring the correlations, in turn resulting in a much better resistivity cell.

The original formulation by Tarantola (described in the equation above) takes both the scaling and the correlation effects (Examples 1 and 2 above) into account. However, Tarantola's approach is not used in practice as it would greatly increase memory requirements and run time for real-world applications of EM or seismic imaging. Hence, current inversion approaches consider only the scaling effect and do not consider correlation effects.

In the simplest least-squares approach the data misfit is described as $$\phi_d(m) = \tfrac{1}{2} \Delta d^* \Delta d, \quad (1)$$

where m is a column vector of size $N_m$ containing the value of the model (e.g. the resistivity or a simple function of resistivity, e.g. the conductivity) in each of the small 3D "pixels", $\Delta d = \Delta d(m) = d(m) - d_{rec}$ is a column vector of size $N_d$ representing the difference between simulated and recorded data and * represents a complex conjugation. Equation (1) is a least-squares sum over the different data points contained in $\Delta d$.

When we want to find a model update $\Delta m$ that gives a smaller misfit, i.e. $\phi_d(m+\Delta m) < \phi_d(m)$, we must understand how a change in the model changes the simulated data. This information is contained in the Jacobian $J = \partial d(m)/\partial m$. The first- and second-order derivatives of the cost function $\phi_d(m)$ are the gradient g(m) and the Hessian H(m) and one can easily show that $g(m) = J^* \Delta d$. The expression for the Hessian is more complex, but it can be shown that a good approximation is $H(m) = J^* J$. Taylor expansion of the cost function for model $m_k$ at iteration k gives $$g_{k+1} = g_k + H_k \Delta m_k. \quad (2)$$

When reaching a minimum for the cost function, its first-order derivatives must vanish. Setting $g_{k+1} = 0$ in the above equation gives $$H \Delta m = -g, \quad (3)$$

where we have dropped the iteration index k for simplicity. This system of equations can be solved, at each iteration, to get the model update Δm. However, this system is unstable and a second regularization term is added to make it stable. This can be done by adding a diagonal term to the Hessian, e.g. replacing H with (H+αI), where α is a scalar and I is the identity matrix.

Solving the system of equation (3), for a given iteration k, is normally done by an iterative method itself (typically a conjugate gradient solver) which involves calculating a lot of matrix-vector products of the form Hv, where v is a vector the same size as m, and additional terms of the form $H_{reg}v$ (when regularization is considered).

As explained above, equation (1) does not represent a good misfit measure because it assumes that the uncertainty is the same for all data points. Today, a typical definition of data misfit is therefore $$\phi_d(m) = \frac{1}{2}\Delta\tilde{d}^*\Delta\tilde{d}, \quad (4)$$

where $\Delta\tilde{d} = \Delta\tilde{d}(m) = \tilde{d}(m) - \tilde{d}_{rec}$ represents the difference between scaled simulated and observed data, and the scaling is defined by the following equation (or by a variant of it):

$$\tilde{d} = \frac{d}{\sqrt{\alpha|d_{rec}|^2 + \eta^2}}. \quad (5)$$

Here, α is a factor representing the multiplicative uncertainty, and η represents the level of additive uncertainty. This means that we scale both data sets (measured and simulated) in exactly the same way. This reduces the impact of some data points (on the data misfit value) whilst emphasising others.

In the formalism of Tarantola, the data misfit is defined as $$\phi_d(m) = \frac{1}{2}\Delta d^* C_d^{-1} \Delta d, \quad (6)$$

where $C_d^{-1}$ is the inverse of the covariance matrix of data uncertainties. [NB. Tarantola does not describe how the covariance matrix is constructed. However, if we have a population of multivariate data we can estimate it from the population, analagous to estimating the mean, variance and standard deviation from a population of measurements of one single variable.] Using equation (1) is the same as replacing $C_d^{-1}$ by the identity matrix. On the other hand, using equations (4) and (5) is the same as replacing $C_d^{-1}$ by an approximation of its diagonal: using a diagonal means that all off-diagonal terms are assumed to be zero, i.e. that the data errors on each data point are assumed to be independent resulting in the measured and simulated data sets being scaled identically as defined above. As explained above however, this is an incorrect hypothesis.

Two particular problems can be identified with equation (6):

First, estimating $C_d$ is not trivial. One can try to use an analytical, parametrized approach to construct $C_d$ but this is complicated and costly. If one wants to estimate $C_d$ from a real or modelled sequences of uncertainty, we would need at least as many sequences as data points, otherwise $C_d$ would be singular, i.e. its inverse would not exist. Besides, $C_d$ is a very large matrix and inverting it is very costly.

Second, even if $C_d^{-1}$ was defined and available, using equation (6) would involve large matrix-vector multiplications, $C_d^{-1}\Delta d$, which are suppressed when using the simpler definitions of data misfit (1) and (4), where the matrix-vector operations are replaced by vector-vector operations.

In order to effectively implement equation (6) whilst eliminating or mitigating these problems, the following approach is proposed:

1. Generate a reference noise-free data set $d_0$ in a model representing the real subsurface as exactly as possible, and using exactly the same acquisition parameters as for the real survey. In other words, we simulate source and receiver points where we expect them to be, and excite the model using the expected source emissions. We determine the data $d_0$ set at the expected receiver points.

2. Generate N alternative data sets, using the same subsurface model, but where acquisition parameters are randomly perturbated according to expected uncertainties (e.g. in shot-point positioning, receiver positioning, source angles, receiver angles, source power, receiver gains, etc), and where realistic noise is added to the data.

3. Form a matrix D, the N columns of which are the difference $d_i - d_0$ between the $i^{th}$ perturbed data set and the reference data set.

4. Apply singular-value decomposition (SVD) to obtain a decomposition of the matrix D in the form $$D = F_0 S_0 K_0 = F_0 W_0 \quad (7)$$

where $F_0$ are singular vectors which represent the principal components of the reference set of simulated data sets, $S_0$ are the singular values and $K_0$ are the coefficients for each simulated data set. Here, D and $F_0$ have size $N_d \times N$ and $S_0$, $K_0$ and $W_0$ have size $N \times N$. $S_0$ is a diagonal matrix, $K_0$ is an orthogonal matrix and the columns of $F_0$ are orthogonal. By keeping only the $N_c$ first columns of matrices $F_0$, $S_0$, $K_0$ and $W_0$, we obtain reduced matrices F, S, K and W, and the exact equation (7) is replaced by an approximation $$D \approx FSK = FW \quad (8)$$

The accuracy of this approximation is related to the size of the singular values $\lambda_i$ which form the diagonal of matrix $S_0$, and to the number $N_c$ of singular vectors that are retained. In practice, a very good approximation can be obtained even with a small value for $N_c$ (e.g. much smaller than $N_d$ and N).

5. We now use the quantities just introduced to redefine the data misfit as $$\phi_d(m) = d_{(i)}^2(m) + d_{(e)}^2(m), \quad (9)$$

where $d_{(i)}$ and $d_{(e)}$ are "internal" and "external" distances. Basically $d_{(i)}$ measures what is correlated in the data difference, while $d_{(e)}$ measures what is unorganized. Equation (9) can be rewritten as:

$$\phi_d(m) = \frac{1}{2}\Delta d^*(FS^{-2}F^* + (1/\lambda_{N_c+1}^2)(I-FF^*))\Delta d. \quad (9)$$

When equation (1) is replaced by the more general equation (6), as in the approach of Tarantola, the expressions for the gradient and Hessian become $g(m) = J^* C_d^{-1} \Delta d$ and $H(m) = J^* C_d^{-1} J$. Comparing equations (6) and (9), one sees that the approach proposed here is similar to providing an approximation of the inverse covariance operator $C_d^{-1}$. In contrast to the usual approaches (equations (1) or (4)), this approximation is not diagonal and takes correlations into account.

We now examine the numerical cost involved when using equation (9) rather than equation (4). As previously explained, solving the normal equations (3) involves calculating many products Hv. When using equation (4), we have H J*WJ, where W is a diagonal matrix containing the square of the scaling factors in equation (5). Products of type Hv are calculated in 3 steps, where the number of numerical operations are indicated between parentheses:
1. u=Jv ($N_d \times N_m$ multiplications),
2. w=Wu ($N_d$ multiplications),
3. Hv=Y'w ($N_d \times N_m$ multiplications), that is approximately $2N_d \times N_m$ multiplications. This approach involves an "implicit Hessian" because H is never calculated nor stored. This is much more efficient than using an "explicit Hessian" approach, where the steps would be
a. L=WJ ($N_d \times N_m$ multiplications),
b. H=J*L ($N_d \times N_m^2$ multiplications),
c. Hv ($N_m^2$ multiplications).

When using equation (9) instead of equation (4), we have $$H = \tfrac{1}{2} J^* (FS^{-2}F^* + (1/\lambda_{N_c+1}^2)(I - FF^*)) J.$$

Products of type Hv can be calculated as follows:
1. u=Jv ($N_d \times N_m$ multiplications),
2. w=F*u ($N_c \times N_d$ multiplications),
3. q=$S^{-2}$w ($N_c$ multiplications),
4. r=Fq ($N_c \times N_d$ multiplications),
5. Hv=½J*r ($N_d \times N_m$ multiplications), for the first term in the Hessian, and steps similar to steps 1, 2, 4 and 5 for the second term. This makes approximately $2N_d \times (N_m + N_c)$ numerical operations. $N_m$ is of the order of 1 million, while $N_c$ is expected to be less than 100. This means that using equation (9) will have a similar numerical cost as using equation (4).

If the general equation (6) was used instead, the Hessian would be H=$J^* C_d^{-1} J$. An implicit Hessian formulation would then involve the following steps:
1. u=Jv ($N_d \times N_m$ multiplications),
2. w=$C_d^{-1}$u ($N_d \times N_d$ multiplications),
3. Hv=J*w ($N_d \times N_m$ multiplications).

The number of operations is much larger than for the approach defined by the proposed approach because $N_d \gg N_c$. For practical implementations of equation (6), one would also need to store the covariance matrix and its inverse in memory.

The approach proposed here is both more stable (no problem with singularities or bad conditioning of the covariance operator) and numerically much more efficient (no problem with memory and much fewer numerical operations). Existing inversion codes can be updated to use the new equation (9) rather than the conventional misfit definition (4).

[Note: all this has been derived for a L2-norm data misfit. Pseudo norms (e.g. a pseudo L1-norm) can be used as well, e.g. to reduce the sensitivity to dead receivers, outliers, etc. Both the conventional and the new approach can be modified by weight functions for that.]

An improved method of computing the measure of data misfit between a simulated data set and a measured data set has been described. In order to determine a model update Δm for a given iteration, it is then necessary to determine the model update that minimises the data misfit measure. This can be done with known techniques, e.g. based on equation (3). Once the model update has been determined, the process can be repeated iteratively until, for example, the improvement in data misfit at each step falls below some threshold. The resulting model can then be further analyzed and, if necessary presented on a computer display as an image of the subsurface.

It will be readily appreciated that the embodiments described above may be incorporated into an exploration process to identify regions likely to produce hydrocarbons.

As part of that process data may be obtained by performing EM, seismic or other surveys in the area of interest. Of course, historical data may be reanalysed to provide new insight into a region. The result of the process may be the drilling of one or more wells within the location.

It will be appreciated by the person of skill in the art that various modifications may be made to the above described embodiments without departing from the scope of the present invention. For example, whilst reference has been made above to EM and seismic imaging, the approach described may be applied to other forms of imaging, e.g. gravitation-magnetic (gravmag) imaging. In another modification, rather than using SVD, a factor analysis may be used.

The invention claimed is:

1. A method of obtaining a model of a sub-surface region, the model comprising a three-dimensional matrix of sub-surface material property values, and comprising:
obtaining an upgoing energy wave data set $d_{rec}$ associated with a set of known acquisition parameters including a source location and a plurality of spaced apart recording locations within, at or above the surface, the upgoing energy waves depending on downgoing energy waves and the sub-surface material properties;
providing a first approximation of said model;
performing simulations using said first approximation of said model to generate (i) a reference upgoing energy wave data set $d_0$, where the acquisition parameters used in the simulation are said set of known acquisition parameters, and (ii) a plurality of perturbed upgoing energy wave data sets $d_i$, where the acquisition parameters are obtained by randomly perturbing said set of known acquisition parameters;
forming a matrix D, the columns of which are the differences $d_i - d_0$ between the ith perturbed data set and the reference data set;
applying an analysis to the matrix D to describe the matrix using a set of vectors;
selecting the most important vectors from said set of vectors to obtain a subset of vectors that describe said matrix D to an approximation; and
performing an iterative procedure to improve said first approximation of said model, or a further approximation model, wherein, at each step of the procedure, a model update Δm is determined, the model update being that model update that minimises a measure of the data misfit between said upgoing energy wave data set $d_{rec}$ and a data set simulated using the updated model, said measure using said subset of vectors to account for uncertainty in the upgoing energy wave data set $d_{rec}$.

2. A method according to claim 1, wherein said sub-surface material property values are sub-surface material electromagnetic property values, e.g. electrical resistance or impedance values, and said energy wave is an electromagnetic energy wave.

3. A method according to claim 1, wherein said sub-surface material property values are sub-surface material accoustic property values, e.g. acoustic impedance, velocity and/or denisty, and said energy wave is a seismic energy wave.

4. A method according to claim 1, wherein said step of applying an analysis to the matrix D to describe the matrix using a set of vectors comprises a principal component analysis and said vectors are singular vectors.

5. A method according to claim 4, wherein said step of applying an analysis to the matrix D to describe the matrix using a set of vectors comprises applying singular-value decomposition, SVD, to obtain a decomposition of the matrix D in the form $D=F_0S_0K_0=F_0W_0$, and retaining only the first Nc columns to obtain reduced matrices $$D \approx FSK = FW$$

Where the columns of F are the set of vectors.

6. A method according to claim 5, wherein the measure of the data misfit is determined using the formula:

$$\phi_d(m) = \tfrac{1}{2}\Delta d^*(FS^{-2}F^* + (1/\lambda_{N_c+1}^2)(I-FF^*))\Delta d$$

where $\Delta d = \Delta d(m) = d(m) - d_{rec}$ is a column vector of size $N_d$ representing the difference between simulated and recorded data, * represents a complex conjugation, and $\lambda_{Nc+1}$ is a singular value of a most important one of the vectors that are not selected.

7. A method according to claim 1, wherein said step of obtaining an upgoing energy wave data set $d_{rec}$ comprises operating one or more energy sources at, above, or within a surface of said sub-surface region to produce said downgoing energy waves and operating detectors at said spaced apart recording locations to detect said upgoing energy waves, and recording the detected upgoing waves.

8. A method according to claim 1, wherein said step of obtaining an upgoing energy wave data set $d_{rec}$ comprises operating one or more energy sources within a body of water above a surface of said sub-surface region to produce said downgoing energy waves and operating detectors at said spaced apart locations to detect said upgoing energy waves, and recording the detected upgoing waves.

9. A method of selecting a region in which to drill in order to produce hydrocarbons and comprising applying the method of claim 1 to obtain a model of a sub-surface region, and examining the model to identify locations within the sub-surface likely to produce hydrocarbons.

10. A method of producing hydrocarbons and comprising selecting a region in which to drill using the method of claim 9, drilling one or more wells in that region, and producing hydrocarbons from the well or wells.

11. A method according to claim 1 and comprising displaying said model on a computer display such that different sub-surface material property values are represented by different colour properties.

\* \* \* \* \*